(12) United States Patent
Cheng

(10) Patent No.: US 10,514,207 B2
(45) Date of Patent: Dec. 24, 2019

(54) SUPERCONDUCTIVE NANO HEAT TRANSFER PLATE TYPE HEAT EXCHANGER AND MANUFACTURING METHOD THEREOF

(71) Applicant: Yu Cheng, Beijing (CN)

(72) Inventor: Yu Cheng, Beijing (CN)

( * ) Notice: Subject to any disclaimer, the term of this patent is extended or adjusted under 35 U.S.C. 154(b) by 685 days.

(21) Appl. No.: 14/435,433

(22) PCT Filed: Oct. 22, 2012

(86) PCT No.: PCT/CN2012/083332
§ 371 (c)(1),
(2) Date: Apr. 21, 2015

(87) PCT Pub. No.: WO2013/170583
PCT Pub. Date: Nov. 21, 2013

(65) Prior Publication Data
US 2015/0292808 A1    Oct. 15, 2015

(30) Foreign Application Priority Data
May 17, 2012    (CN) .......................... 2012 1 0154994

(51) Int. Cl.
*B23P 15/26*    (2006.01)
*B21D 53/04*    (2006.01)
(Continued)

(52) U.S. Cl.
CPC .......... *F28D 15/0266* (2013.01); *B23P 15/26* (2013.01); *B21D 53/04* (2013.01); *B82Y 30/00* (2013.01); *F28F 2013/001* (2013.01)

(58) Field of Classification Search
CPC ....... B23P 115/26; F28F 2275/06; F28F 3/00; B21D 53/04; B21D 53/02; F28D 9/00; F28D 1/03
See application file for complete search history.

(56) References Cited

U.S. PATENT DOCUMENTS 5,799,726 A * 9/1998 Frank .................... A23G 9/222
165/109.1
2004/0069454 A1    4/2004 Bonsignore et al.
(Continued)

FOREIGN PATENT DOCUMENTS

CN    1673663 A    9/2005
CN    1853849 A    11/2006
(Continued)

OTHER PUBLICATIONS

Machine Translation of CN 101251348 A1.*
(Continued)

*Primary Examiner* — Christopher J Besler
(74) *Attorney, Agent, or Firm* — Novick, Kim & Lee, PLLC; Allen Xue

(57) ABSTRACT

A superconductive nano heat transfer plate type heat exchanger consisting of a plurality of superconductive nano plate bundles by welding, the plate bundles being formed by welding a plurality of heat transfer plates together and sealed in vacuum, each of the plate bundles comprising an evaporation zone and a condensation zone, inside the plate bundle is padded a superconductive nano medium. The heat exchanger enhances heat transfer efficiency and may perform highly efficient heat transfer at different pressures, different temperatures, within different application scopes.

9 Claims, 4 Drawing Sheets

(51) Int. Cl.
*F28D 15/02* (2006.01)
*B82Y 30/00* (2011.01)
*F28F 13/00* (2006.01)

(56) References Cited

U.S. PATENT DOCUMENTS

| | | | |
|---|---|---|---|
| 2004/0069837 | A1 | 4/2004 | Fujiyama et al. |
| 2011/0240270 | A1* | 10/2011 | Hisanaga ............... F28D 7/1684 |
| | | | 165/151 |
| 2012/0090822 | A1* | 4/2012 | Francois ............... F28D 9/0006 |
| | | | 165/170 |

FOREIGN PATENT DOCUMENTS

| | | | | |
|---|---|---|---|---|
| CN | 101251348 | A | | 8/2008 |
| CN | 102205485 | A | | 10/2011 |
| JP | 2012189261 | A | * 10/2012 | ................ F28F 9/26 |
| WO | WO 2010/133791 | A1 | * 11/2010 | ................ F28F 3/12 |

OTHER PUBLICATIONS

Machine translation of JP 2012-189261 A.*
Dongdong Li et al. "An Experimental Study on the Start-up Process of Heat Pipes Filled with Nanofluids" Chemical Engineering & Machinery. Dec. 2010, issue 6, pp. 684-686, ISSN 0254-6094.

* cited by examiner

SUPERCONDUCTIVE NANO HEAT TRANSFER PLATE TYPE HEAT EXCHANGER AND MANUFACTURING METHOD THEREOF

FIELD OF THE INVENTION

The present invention relates to the field of heat transfer and mass transfer, and more specifically to a superconductive nano heat transfer plate type heat exchanger and a manufacturing method thereof.

BACKGROUND OF THE INVENTION

A traditional heat exchanger adopts two different mediums passing-through surfaces. Surface heat exchange can only be generated when the two kinds of heat transfer mediums are driven by power. Regardless of a tube type or a plate type, they both adopt the same mode; therefore, the power consumption is very huge, without a natural process of evaporation and condensation. Upon energy shortage in the current international society, an energy saving equipment is key to energy saving and consumption reduction. Regardless of what form of effective and advanced monitoring method is adopted, only the constant improvement of the equipment processing process can enhance sufficient utilization of disposable energy sources or zero energy consumption (low-grade energy), also including effective recycling of afterheat. The superconductive nano heat transfer plate type heat exchanger has a substantive difference from a traditional heat transfer device. For the superconductive nano heat transfer plate type heat exchanger, a superconductive nano solution is heated and evaporated, with phase transition occurring in a resistance-free state. The superconductive nano solution, after heating inside of a plate buddle, is transferred to further various different kinds of mediums, thereby implementing an evaporation condensing cyclical heat transfer process. Therefore, the superconductive nano heat transfer plate type heat exchanger is an innovative and efficient energy-saving heat exchange device in the field of heat transfer and mass transfer heat change, which is also pioneering home and abroad. By changing a traditional welding plate into a plate buddle, this process adjustment and innovation enables efficient heat transfer at different pressures, different temperatures, within different application scopes. It is crucial to promote economic benefits and reduce "unit" energy consumption.

SUMMARY OF THE INVENTION

The technical problem being solved by the present invention is aimed to manufacture a new-model plate type heat exchanger to enable the heat transmitter to transfer heat efficiently at different pressures, different temperatures, within different application scopes.

The technical solution employed by the present invention is providing a superconductive nano heat transfer plate type heat exchanger consisting of a plurality of superconductive nano plate bundles by welding, the plate bundles being formed by welding a plurality of heat transfer plates together and sealed in vacuum, each of the plate bundles comprising an evaporation zone and a condensation zone, inside the plate bundle being padded a superconductive nano medium.

The present invention further provides a method for manufacturing a superconductive nano heat transfer plate type heat exchanger, the method comprising steps of:

1) designing a heat transfer plate mould employing numerical value simulation, determining thermal efficiency and flow resistance of the heat transfer plate, adjusting corrugation angle and depth of the mould according to physical characteristics of different materials of heat transfer plates, and performing cold press molding;

2) performing flaw detection to the molded plates, and performing thinned measurement after stretching using ultrasonic waves;

3) performing plate bundle welding to the molded heat transfer plates, and meanwhile performing gas tight test;

4) configuring a superconductive nano medium and then padding it into the plate bundles;

5) performing vacuum seal to the plate bundles using mechanical vacuum;

6) determining the number of plate bundles based on the design parameters, and combining the superconductive nano plate bundles, and performing an overall gas tight or water pressure test to the combined plate bundles;

7) loading the combined plate bundles into the housing according to a design requirement to perform an overall pressure test detection.

An advantageous effect of the present invention is that because a nano technology is applied to a heat transfer plate heat conductive liquid, the conductivity is stronger; further, due to phase transition in a vacuum state, the advantages of both phase transition process and corrugated shape are combined, thereby forming an intensified heat exchange, and meanwhile enhancing the heat transfer efficiency between the conductive liquid and corrugation.

BRIEF DESCRIPTION OF THE ACCOMPANYING DRAWINGS

DETAILED DESCRIPTION OF THE PREFERRED EMBODIMENTS

The calculation equation of the superconductive heat transfer plate heat transfer power is:

$$Q=T_1-T_0/Re=T_0-T_2/R_{C(W)}$$

Wherein:
  Q—thermal power (W)
  $T_1$—high-temperature thermal source temperature (° C.)
  $T_0$—To working medium vapor temperature (° C.)
  $T_2$—low-temperature cold source temperature (° C.)
  $R_e$—thermal resistance for heating gasification zone (° C./W)
  $R_c$—thermal resistance for heat release condensing zone (° C./W)
wherein working medium vapor temperature $T_0$:

$$T_0=\frac{1}{2}(T_1+T_2)+Q/2(R_C-R_e)(° C.)$$

The superconductive nano heat transfer plate type heat exchanger consists of a plurality of superconductive nano plate bundles by welding, the plate bundles being formed by welding a plurality of heat transfer plates together. The plate bundles of the superconductive nano heat transfer plate type heat exchanger mix a nano solution with other liquid, and the resulted mixed solution is used as a superconductive nano medium (heat conductive carrier). The advantage of adopting the nano solution is: after the nano solution is heated, it is rapidly evaporated within a vacuum plate bundle; molecules or atoms within an evaporation chamber within a low gas pressure range (generally between $10^{-3}$-$10^{-10}$ torr) do not collide with each other; a growth surface during the evaporation process has no activity; besides, reversible conversion is implemented because balance is controlled by chemical, mechanical and transport phenomena.

In the present invention, the superconductive nano medium is formed by mixing nano solution with other solutions (working medium), wherein the nano solution is an oxide slurry, e.g., silicon oxide slurry (SiO), aluminum oxide slurry ($AL_2O_3$), copper oxide slurry, or a mixed slurry of two or three of the above slurries, and may also be other oxide slurries, wherein a nanometer particle has a diameter of 30 nm, a length of 10 μm, and a purity>90 wt %. The other solutions are one of high purity water ($H_2O$), sodium dichromate ($Na_2Cr_2O_7 \cdot 2H_2O$), ammonium solution, R134A; the proportion of the oxide slurry to other solutions is 5‰ (weight ratio). A settling chamber nano particle in a gravity field causes the superconductive nano solution to concentrate into colloidal particles at the bottom of the heat transfer plate, to occur hard ball disordered—ordered phase transition heat release, and to form a three-dimensional ordered structure.

Figure 1:
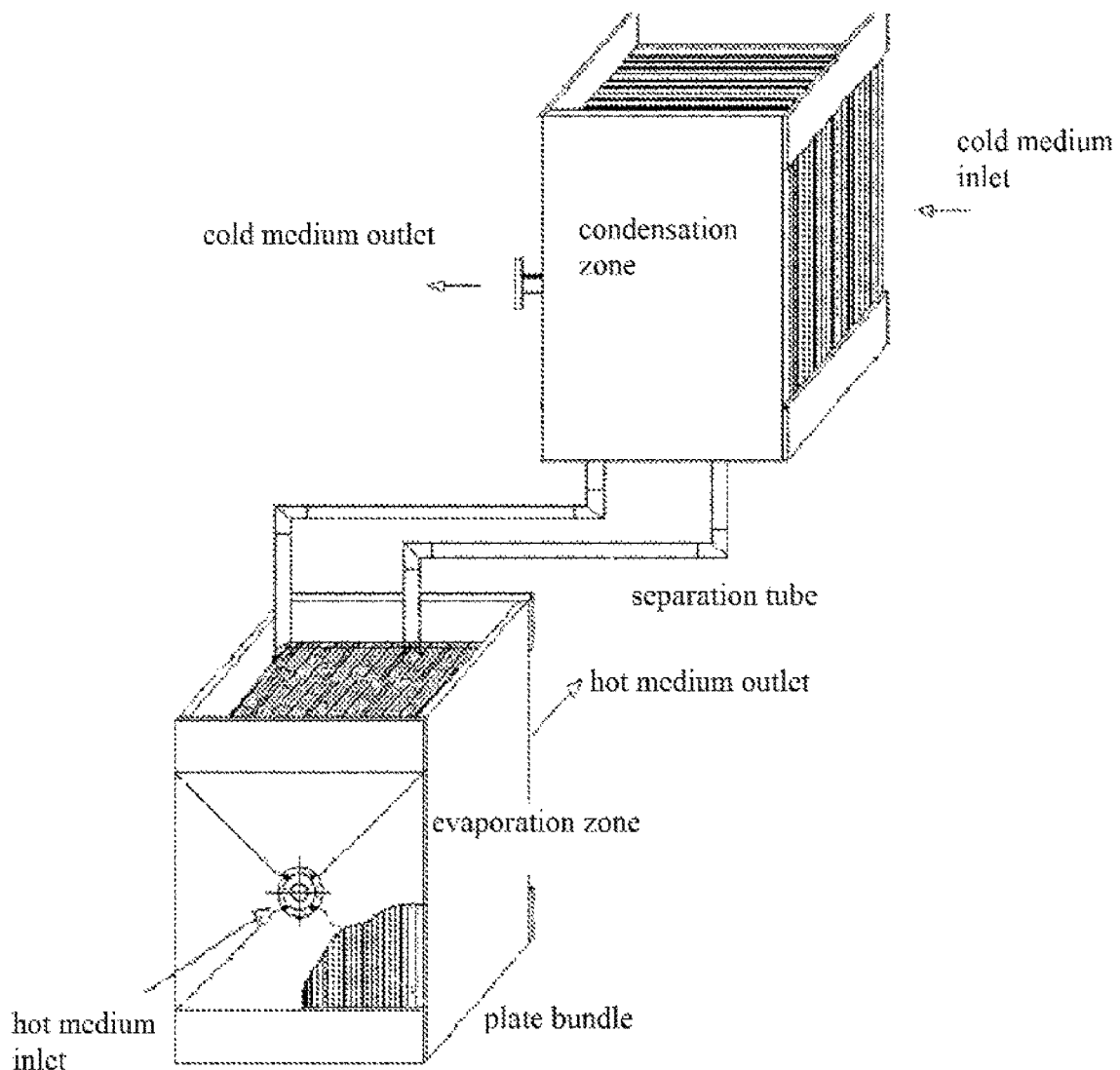
FIG. 1 is a separate type structure of a superconductive nano heat transfer plate heat exchanger in the present invention.
Figure 2:
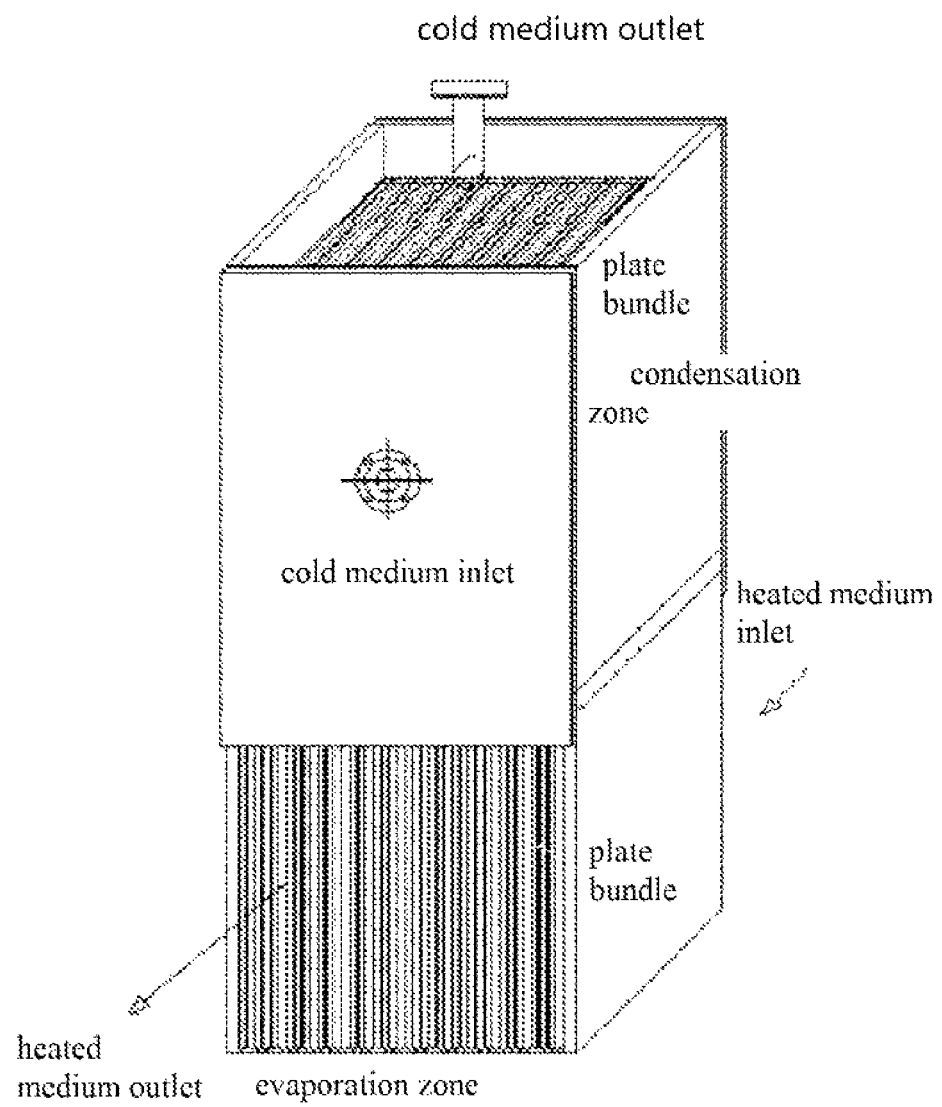
FIG. 2 is an integral structure of a superconductive nano heat transfer plate heat exchanger in the present invention.

The superconductive nano medium is a high-speed resistance-free heat transfer element, which is subjected to phase transition heat conduction in a resistance-free state after being vacuumed, and the heat exchange process is completed in the evaporation zone and the condensation zone. With reference to FIGS. 1 and 2, inside the plate bundle is a superconductive nano medium. After the superconductive nano heat transfer plate bundle is heated in the evaporation zone, the superconductive nano medium within the plate bundle is rapidly evaporated into a heat medium (it is a phase transition process from a liquid state to a gas state), and arrives in the condensation zone through a separation pipe. The superconductive nano heat medium is condensed into liquid (i.e., cold medium) after being cooled. The condensed liquid returns to the evaporation zone along an internal wall of the heat transfer plate bundle under the action of gravity and is heated and vaporized again, repeating like that. The flow direction of the heat exchange medium in the evaporation zone and the condensation zone may be arbitrary; besides, the pressures of the evaporation zone and the condensation zone may be different. For heat transfer within a temperature range of −20° C.-500° C., the temperature differences between the evaporation zone and the condensation zone between different plate bundles are identical.

The evaporation zone and the condensation zone may be integral or separate. FIG. 1 shows a separate structure, while FIG. 2 shows an integral structure. The materials of the superconductive nano heat transfer plate bundles in the two zones may be identical or different, which may be determined based on the compatibility of different mediums with the superconductive nano plate bundles and the corrosion-resistance. Some nano solutions may produce corrosion to the heat transfer plates after being heated, e.g., a stainless steel heat transfer plate is resistant to chloride corrosion, but in the case of chloride ions>10 pmm in the solution at 100° C., the heat transfer plates will be corroded quickly.

Figure 3:
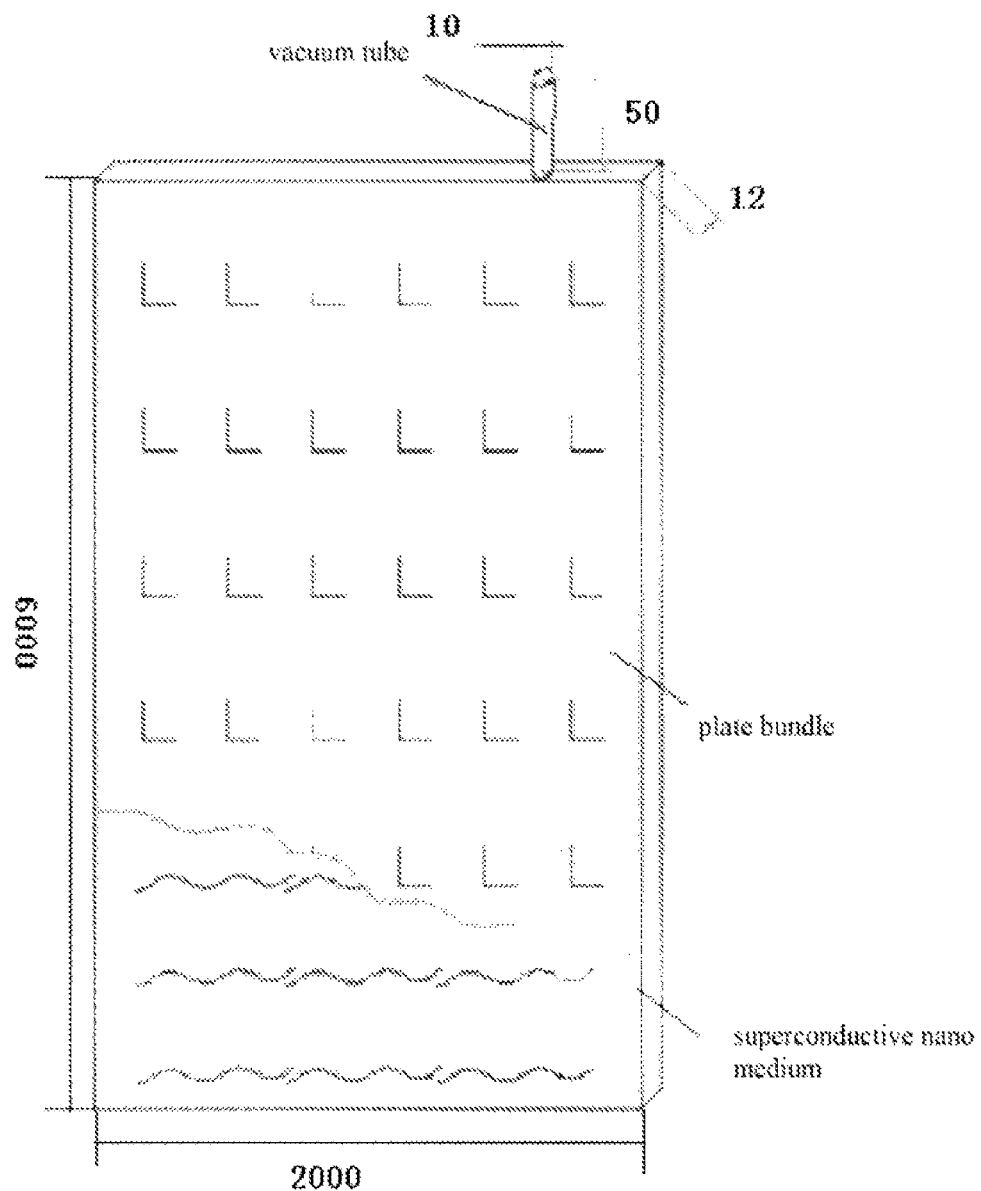
FIG. 3 is a schematic diagram of a superconductive nano heat transfer plate bundle in the present invention.
Figure 4:
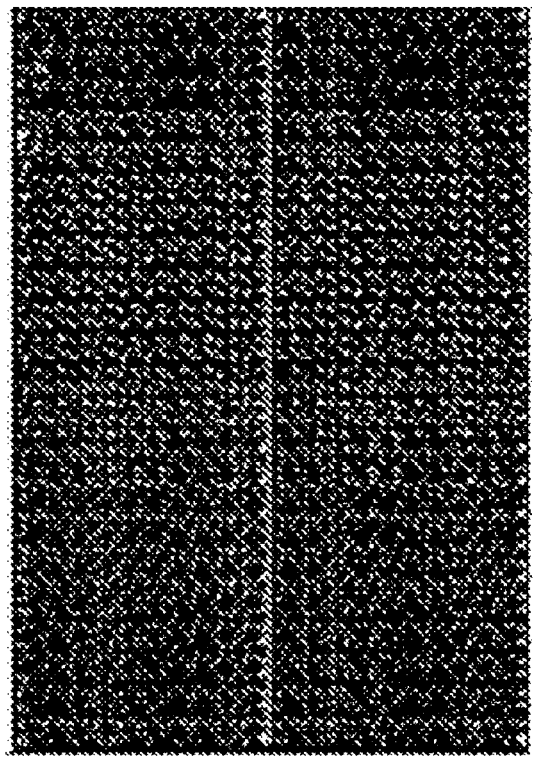
FIG. 4 is a schematic diagram of a superconductive nano heat transfer plate in the present invention.

With reference to FIG. 3, the superconductive nano heat transfer plate bundles in the evaporation zone and the condensation zone are: 2 m (2000 mm) wide, 6 m (6000 mm) long, and 12 mm thick, while the vacuum tube thereon has a diameter of 10 mm, and a length of 50 mm, and the plate bundle employs vacuum seal.

A plurality of heat transfer plates are welded into a plate bundle through a welding process, and then the plate bundles are welded and assembled into a superconductive nano heat exchanger. The combined plate bundles may be stacked unlimitedly, thereby achieving a large-sized equipment. The heat exchange area (F) of the superconductive nano heat exchanger is calculated with the following equation:

$$F = f \cdot 2n (m^2)$$

f—single plate heat exchange area ($m^2$)
n—number of heat exchange plates

The superconductive nano heat exchanger preferably selects different plate models on the basis of thermal power calculation. The superconductive nano heat transfer plate type heat exchanger withstand a pressure up to ΔP>7 MPa and adopts a vacuum technology (the vacuum degree reaches $\Delta P \geq 10^{-5}$ Pa). The superconductive nano heat exchanger is an efficient heat exchange device, which has a high heat transfer speed and can complete a heat conduction process within 2-15 seconds.

The superconductive nano heat exchanger heat transfer calculation mode is specified below:
The basic equation of heat transfer is $Q = K A \Delta t_m$.
Heat transfer coefficient—$k(w/m^{2\circ} C.)$
Logarithm average temperature difference—$\Delta t_m (° C.)$
Heat exchange area—$A(m^2)$
The heat transfer coefficient-total coefficient relation equation $$K = \left( \frac{1}{a_1} + Rs1 + \frac{\delta}{\lambda} Rs2 + \frac{1}{a_2} \right)^{-1}$$

In the equation, $$\frac{1}{a_1}$$

—plate thermal side fluid heat transfer thermal resistance
$\alpha_1$—thermal side heat exchange coefficient
$R_{s1}$, $R_{s2}$—dirt layer thermal resistance, $$\frac{\delta}{\lambda}$$

—plate layer thermal resistance
δ—plate thickness $$\frac{1}{a_2}$$

—plate cold side fluid heat transfer thermal resistance
$\alpha_2$—cold side heat exchange coefficient
Calculation of the heat transfer unit number NTU is specified below:

$$NTU = \frac{KA}{GC_p}$$

K—heat transfer coefficient [W/(m²·K)]
A—heat transfer area (m²) of a single plate
G—flow rate (kg/s)
Cp—specific heat [j/(kg·K)]

The heat transfer plates are highly efficient heat transfer plates which are formed by pressing various different kinds of metal plate materials: DC04 (carbon steel), Or18N.9T (stainless steel), B10/B30 (copper alloy), and 254SM (one kind of stainless steel). The plates have a depth of 0.4-1.0 mm, and the above highly efficient heat transfer plates which are formed by pressing various different kinds of metal plate materials are welded into plate bundles. The plate bundles formed by welding the plates may be stacked unlimitedly. The maximum combination area for a single set is F>10⁴ m².

Herein, the welding of plates adopts photoelectrical tracking fusion welding. The entire welding processing process can be completed by only inputting plates of different widths into a computer control system before welding. The superconductive nano heat transfer plate bundle is formed by welding using a specific device for full-automatic photo-electrical tracking welding. Through the computer control, -line full automatic welding of heat exchange plate component plate type heat exchanger may be resolved, which realizes single-welding gun parallel real-time welding, greatly enhances the welding speed, and effectively guarantees welding quality.

A method for manufacturing a superconductive nano heat transfer plate type heat exchanger comprises steps of:

1) Designing a heat transfer plate mould employing numerical value simulation, determining thermal efficiency and flow resistance of the heat transfer plate, adjusting corrugation angle and depth of the mould according to physical characteristics of different materials of heat transfer plates, and performing cold press molding. From the perspective of thermodynamics, the corrugation depth is selected between 1.5 mm-6.5 mm; the hard plate type corrugation angle is greater than 120°; the NTU value may reach 7; the end difference does not exceed 1° C. A soft plate type corrugation angle is not greater than 120° C., with a reduced resistance, a NTU value not greater than 4, and a large end difference.

2) performing flaw detection to the molded plates, and performing thinned measurement after stretching using ultrasonic waves;

3) performing plate bundle welding to the molded heat transfer plates, and meanwhile performing gas tight test;

4) configuring a superconductive nano medium and then padding it into the plate bundles;

5) performing vacuum seal to the plate bundles using mechanical vacuum;

6) determining the number of plate bundles based on the design parameters, and combining the superconductive nano plate bundles, and performing an overall gas tight or water pressure test to the combined plate bundles;

7) the superconductive nano heat transfer plate type heat exchanger is designed according to associated working condition and technical requirement, loading the combined plate bundles into the housing according to a design requirement to perform an overall pressure test detection. The housing materials for the evaporation zone and the condensation zone may be selected according to different process technical requirements.

Because a nano technology is applied to a heat transfer plate heat conductive liquid, the conductivity is stronger; further, due to phase transition in a vacuum state, the advantages of both phase transition process and corrugated shape are combined, thereby forming an intensified heat exchange, and meanwhile enhancing the heat transfer efficiency between the conductive liquid and corrugation. Advantages of both nano heat transfer and corrugation plate transfer are embodied, and with the superposition of the advantages, the superconductive nano heat transfer plate type heat exchanger has a substantive difference from the traditional heat exchange device.

The superconductive nano plate type heat exchanger is an efficient heat exchange device and a heat exchange equipment carrying out heat exchange through heat conduction, and has a simple structure and a wide application range and is convenient to maintain. The superconductive nano plate type heat exchanger is a heat exchange device having a plurality of combined forms. The superconductive nano plate type heat exchanger can exchange heat under any heat exchange condition at −20-500° C. and is easy to install, and applicable to nano heat transfer plate type heat exchange in various fields such as petrochemical industry, electrical power, metallurgy, national defense, civilian appliances. The superconductive nano plate type heat exchanger may be varied according to different working condition technical requirements; and may be integral or separate and has a strong flexibility, which does not affect the working efficiency of the heat exchange device, besides, its pressure bearing capability may also be varied under different process conditions. Further, there are also a plurality of selections for the heat exchange plate materials and the corrugation patterns. Additionally, it also reduces manufacturing cost and enhances heat conductive efficiency. It is the most advanced heat exchange device home and abroad.

The invention claimed is:

1. A method for manufacturing a plate type heat exchanger, comprising:
designing a heat transfer plate mold by employing numerical value simulation;
forming a plurality of heat transfer plates by cold press molding;
performing flaw detection to the plurality of heat transfer plates;
welding the plurality of the heat transfer plates to form a first plate bundle and a second plate bundle;
adding a superconductive nano medium into the first plate bundle;
performing vacuum seal to the first plate bundle and the second plate bundle using mechanical vacuum;
forming a hot medium inlet and a hot medium outlet for a hot medium passing through the first plate bundle;
forming a cold medium inlet and a cold medium outlet for a cold medium passing through the second plate bundle;
connecting the first plate bundle with the second plate bundle by a separation pipe so that, during operation, the superconductive nano medium evaporates in the first plate bundle, the evaporated superconductive nano medium enters the second plate bundle through the separation pipe, condenses on the second plate bundle, and the condensed superconductive nano medium returns to the first plate bundle along an internal wall of the second plate bundle.

2. The method according to claim 1, wherein the first plate bundle serves as an evaporation zone and the second plate bundle serves as a condensation zone, and the first and second plate bundles have a dimension of 6 m long and 3 m wide.

3. The method according to claim 1, wherein the superconductive nano medium is prepared by mixing a nano solution with one or more other solutions, and a weight of the nano solution to the one or more other solutions is 5‰.

4. The method according to claim 3, wherein the nano solution is a slurry that contains a plurality of nano particles of an oxide, wherein the nano particles have an average diameter of 30 nm.

5. The method according to claim 4, wherein the slurry contains silicon oxide, aluminum oxide, copper oxide, or mixtures thereof.

6. The method according to claim 3, wherein the one or more other solutions are chosen from high purity water ($H_2O$), sodium dichromate ($Na_2Cr_2O_7 \cdot 2H_2O$), ammonium solution, or a refrigerant.

7. The method according to claim 1, wherein the first and the second plate bundles are adapted to maintain a vacuum degree of $\Delta P \geq 10^{-5}$ Pa, to withstand a pressure of greater than 7 MPa and a temperature between −20° C. and 500° C.

8. The method according to claim 1, wherein the heat transfer plate is made from a carbon steel, a stainless steel, or a copper alloy.

9. The method according to claim 1, further comprising installing a vacuum tube on the first plate bundle.

\* \* \* \* \*